Feb. 13, 1945.    M. R. HARRIS    2,369,294
WELDING APPARATUS
Filed Feb. 25, 1939    3 Sheets-Sheet 1

Inventor
Marcus R. Harris
By Blackmore, Spencer & Hurd
Attorneys

Feb. 13, 1945. M. R. HARRIS 2,369,294
WELDING APPARATUS
Filed Feb. 25, 1939 3 Sheets-Sheet 2

Inventor
Marcus R. Harris
By
Blackmore, Spencer & Flint
Attorneys

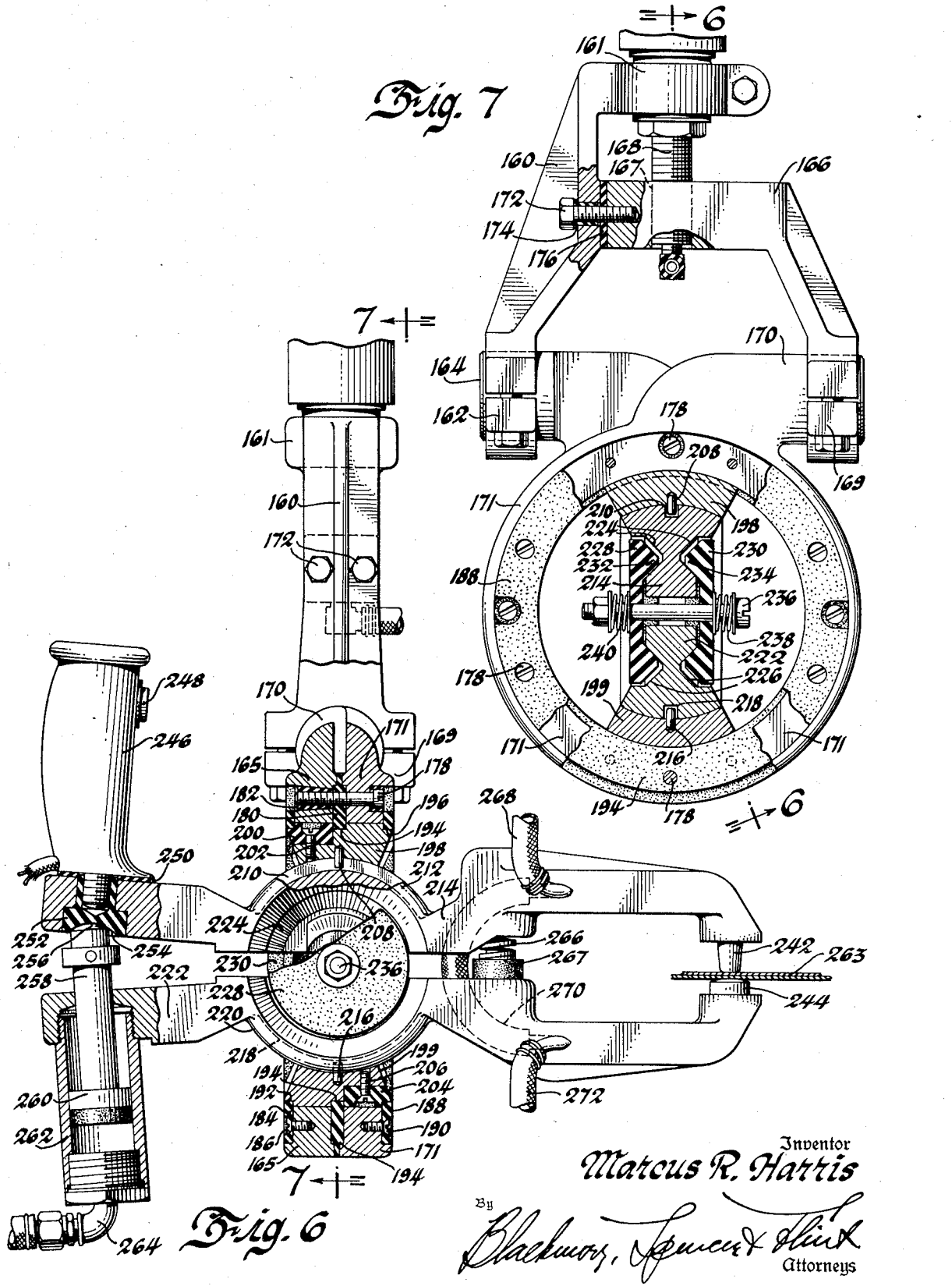

Patented Feb. 13, 1945

2,369,294

UNITED STATES PATENT OFFICE 2,369,294

WELDING APPARATUS

Marcus R. Harris, Indianapolis, Ind., assignor to General Motors Corporation, Detroit, Mich., a corporation of Delaware Application February 25, 1939, Serial No. 258,406

19 Claims. (Cl. 219—4)

This invention relates to welding apparatus and has particular reference to electric resistance welding apparatus, especially spot welding apparatus of the portable type.

Among the objects of the invention are the following: to provide an improved spot welding device having a wide range of welding positions without having to move the entire welding device with the heavy cable usually provided for conducting welding current to the welding electrodes; to provide an improved welding device in which the welding jaws carrying the electrodes are pivotally mounted in a novel manner; to provide a gun type spot welding apparatus having pivotally mounted jaws actuated by means of hydraulic pressure in combination with a novel control means; to provide a new and improved portable spot welding device in which the pressure of the welding electrodes on the work to be welded is built up to the desired point before the welding circuit is completed; to provide a spot welding device of simple construction and one that has a long life; to provide a new and improved means of building up and/or applying the desired welding pressure on the parts to be welded; and to provide a simple means for pivotally mounting welding jaws whereby the jaws and electrodes carried thereby may be moved to a wide range of positions without having to move the welding cable. Other objects and advantages of my invention will become more apparent from the detailed description which follows, reference being made to the drawings forming a portion of this specification, in which:

Figure 6 is a view substantially on line 6—6 of Figure 7 of a welder in accordance with my invention, showing a different form of support for the welding jaws and a different hydraulic actuated means for applying welding pressure to the parts to be welded than illustrated in the form of the invention of Figures 1–5 inclusive, the welding electrodes being shown in welding position.

Figure 7 is a partial sectional view taken on line 7—7 in Figure 6.

Figure 1:
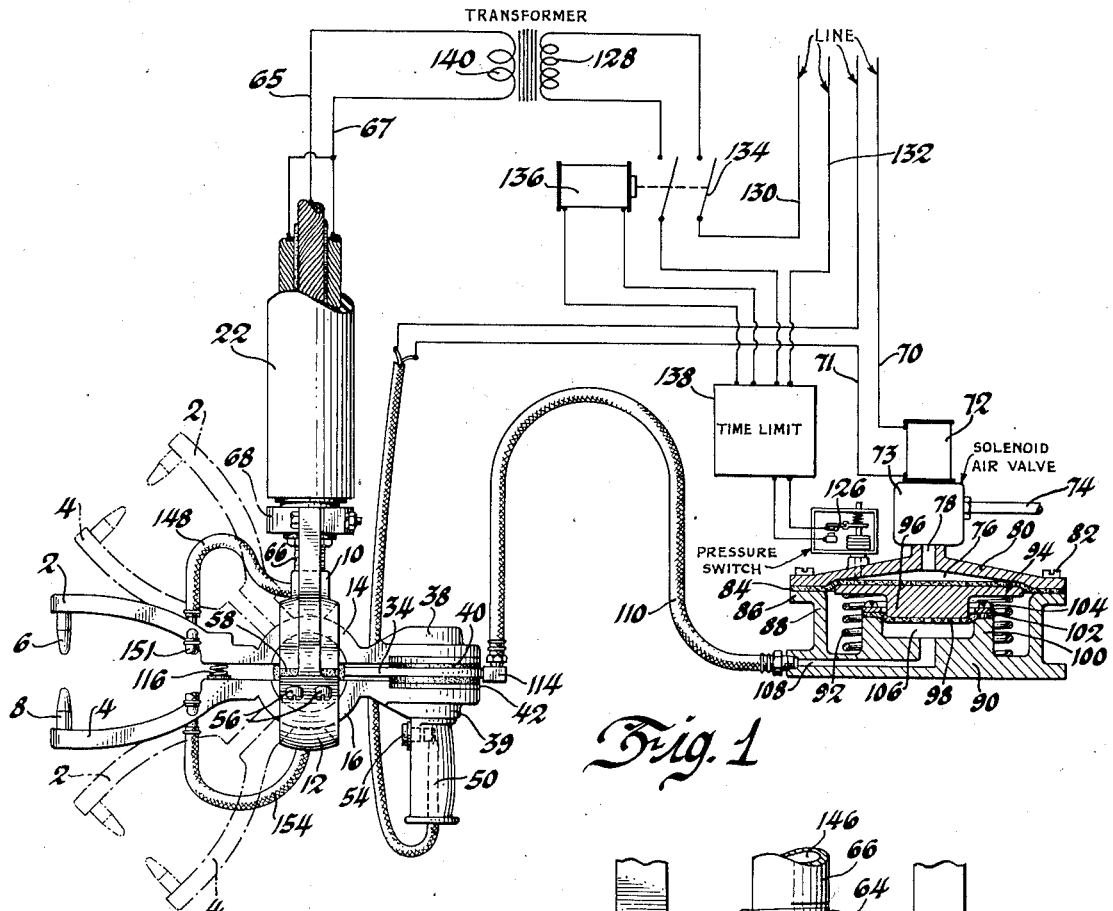
Figure 1 is a view showing one form of welding gun in accordance with my invention with an air and hydraulic pressure means for actuating the welding jaws and a means for controlling the welding mechanism shown somewhat diagrammatically, the parts being shown in non-welding position.
Figures 2, 3:
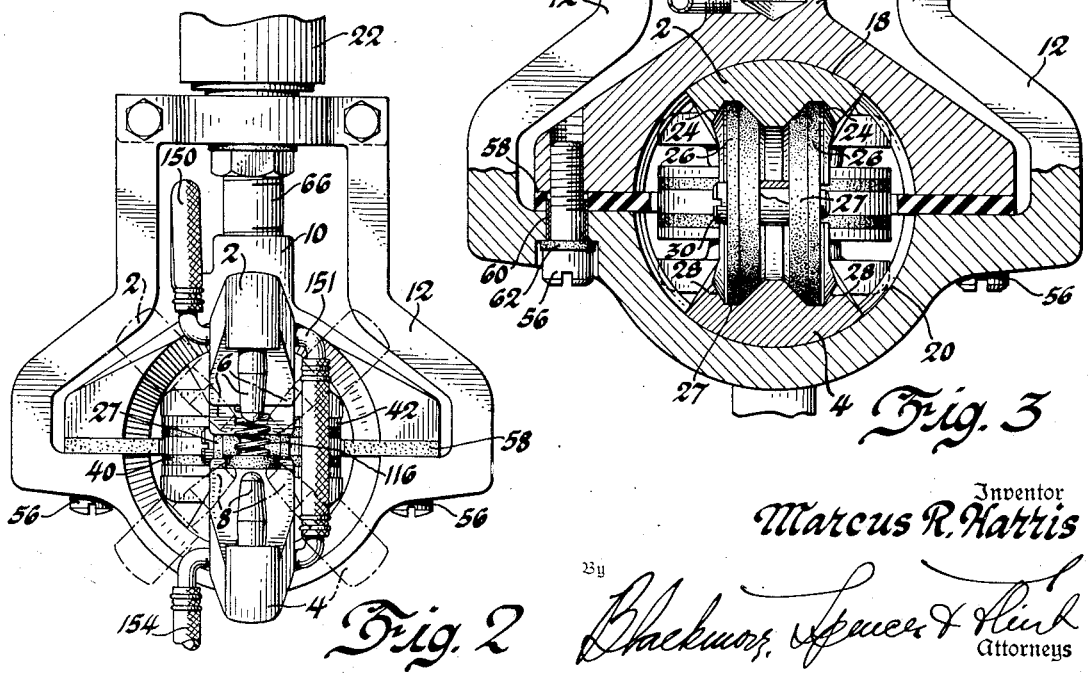
Figure 2 is an end view looking to the right in Figure 1.
Figure 3 is a partial sectional view on line 3—3 in Figure 4 showing the pivotal connection between the welding jaws, and the support therefor.

In Figures 1–4, inclusive, of the drawings, 2 and 4 are opposed jaws of an electric spot welding apparatus, having opposed welding electrodes 6 and 8, respectively, fixed thereto. The jaws are carried in brackets or supports 10 and 12 and the jaws have curved bearing portions or surfaces 14 and 16 approximately midway of the length of the jaws adapted to fit within mating curved portions 18 and 20 of the brackets. The surfaces just referred to are each in the shape of a portion of a sphere whereby the welding jaws may move within the brackets (when the welding electrodes are not clamped against the work) to move the electrodes in a plurality of planes to any point of what may be termed a 90° spherical sector. The construction enables the jaws and electrodes to be moved without moving the brackets to which is attached a welding cable indicated generally at 22 in Figure 1 and which is shown somewhat diagrammatically in this figure.

Within the curved bearing portion of the welding jaw 2 are two arcuate grooves 24 within which are mating circular projecting portions 26 of a circular shaped member 27 formed of suitable insulating material. Jaw 4 has similar arcuate grooves 28 within which are mating circular projecting portions 26 of insulator 27. The grooves form raceways for the projecting portions during relative movement of the welding jaws. A bolt or pin member 30 fixed to member 27 acts as a pivot for one end 32 of a rearwardly extending arm 34, said arm having an annular portion 36 between rear ends 38, 39 of the welding jaws. On each side of the annular portion is a circular flexible diaphragm 40, formed of neoprene or other suitable material. In the construction shown the material is a suitable electrical insulator. Circular washer-like members 42 having grooves 44 therein are between the diaphragm and the adjacent ends of the jaws members, said grooves 44 cooperating with projecting portions 46 formed on each side of the annular portion 36 to form a tight seal. The parts just described form a hydraulic chamber 47. The rear ends of the welding jaws have cut away portions 48 within which the washer-like members 42 may fit. A handle 50 removably secured to one of the welding jaws at 52 has a push button switch 54 for closing an electric circuit to a solenoid actuated air valve, the purpose of which is later to be described more fully.

Figure 4:
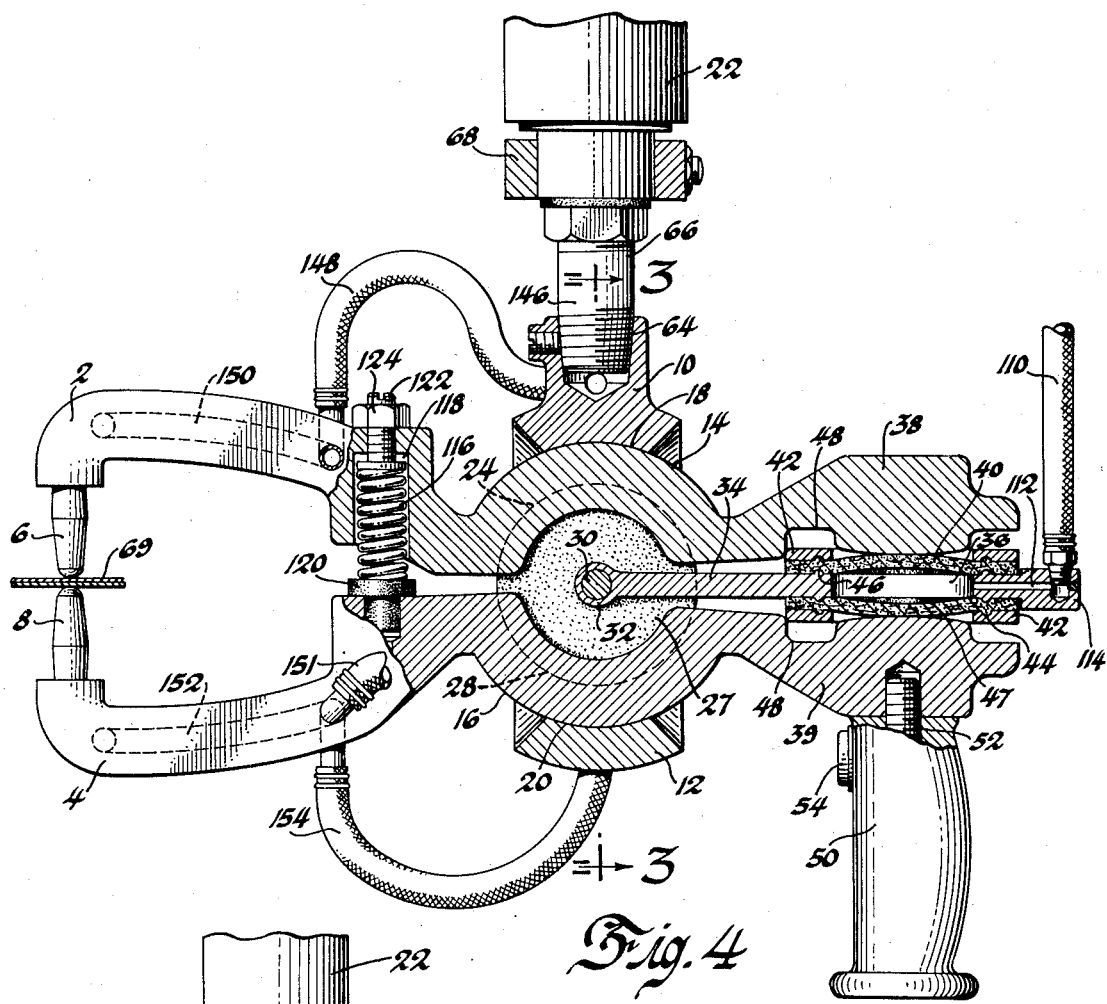
Figure 4 is a partial sectional view taken substantially on the longitudinal center line of Figure 1 with the welding jaws in position for welding.

The brackets 10 and 12 are removably secured to each other by means of screws 56 and are so secured that each bracket is electrically insulated from the other, insulators 58, 60 and 62 being provided for this purpose. Bracket 10 is secured at 64 to a suitable hollow electrical conductor 66 forming a portion of a connection 65 to one side of the secondary of a welding transformer, while bracket 12 is secured at 68 to the opposite side 67 of the welding circuit. The brackets, welding jaws and electrodes are formed of conducting material and after the electrodes are forced against the work 69, as shown in Figure 4, the welding circuit is completed and the welding operation performed.

The means which applies the pressure to the electrodes comprises a combined air and fluid actuated mechanism. The closing of the switch 54 in the handle of the welding jaw completes an electrical circuit 70, 71 to a solenoid 72 which actuates an air valve indicated at 73. Any suitable air valve may be used, the action being such that when the solenoid 72 is energized, air under pressure from the source of supply (not shown) may flow from pipe 74 into a chamber 76 through an opening 78 formed in a cover member 80. Member 80 and screws 82 secure the outer edge of a flexible diaphragm 84 of neoprene or other suitable material to a flange 86 on a wall 88 of hollow member 90. Within member 90 and biased by a spring 92 toward the underside of the diaphragm 84 and in contact therewith is a movable member or piston 94. The underside of the piston 94 has a portion 96 of smaller diameter in contact with a flexible diaphragm 98, the edges of the latter being secured to the upper end of an inner wall 100 of member 90 by means of ring member 102 and screws 104. The wall 100 and flexible diaphragm form a chamber 106 for hydraulic fluid.

A passage 108 in member 90 leads from chamber 106 to one end of a flexible, fluid conducting member 110 leading to the chamber 47 between the rear ends of the welding jaws, by means of a passage 112 in a coupling 114 formed integral with the rear of arm 34. Downward movement of piston 94 and diaphragm 98 builds up hydraulic pressure in the chamber 47, which in turn actuates the welding jaws to clamp the work to be welded between the welding electrodes. Movement of the welding jaws to clamping position compresses a coil spring 116 on the side of the pivot opposite to that of the end carrying the actuating means. One end of the coil spring 116 is mounted within an opening 118 in one of the welding jaws, the other end bearing against a member 120 carried by the other of the two welding jaws. Member 120 is formed of suitable insulating material in order to prevent any flow of electricity at this point. A screw means 122 and lock nut 124 are adapted to adjust the compression of the spring 116. When the hydraulic pressure in chamber 47 is released after completion of a weld the coil spring returns the welding jaws to open position.

In the operation of the device the jaws are first clamped in welding position about the parts to be welded as just described, and thereafter the welding current is supplied to the electrodes. This is accomplished by the closing of pressure actuated switch 126 by means of the air pressure in chamber 76 reaching a certain amount, which pressure is reached after the hydraulic pressure in the chamber 47 reaches that needed to clamp the electrodes on the work with a suitable welding pressure.

Closing of switch 126 completes an electrical circuit from a source of electric power through the primary 128 of a transformer by means of leads 130 and 132 and switch 134 controlled and actuated by solenoid 136 and welding time limit device 138. The completion of an electrical circuit from the power source through the primary of the transformer causes the secondary 140 of the transformer to become energized whereby welding current passes by means of electrical conductors 65 and 67 of cable 22 to the electrodes clamped against the work and through the work to be welded to form a spot weld.

After the weld is completed the welding time limit device causes the switch 134 to open and break the circuit leading to the primary of the transformer, thereby de-energizing the secondary and causing a break in the current flow through the work and welding electrodes. After the current has ceased to flow through the work being welded a short interval of time, the pressure in chamber 76 is reduced whereby the hydraulic pressure in chamber 47 also is reduced to cause the welding jaws to separate and release the work. Opening of the air valve permits the air in chamber 76 to exhaust to the atmosphere whereby the air pressure in said chamber is reduced. The specific constructions of the welding time limit device and air valve form no part of the present invention and hence are shown somewhat diagrammatically in the drawings. Various forms of welding time limit devices and solenoid actuated air valves are available and the construction and operation thereof are well known to those skilled in the art.

If desired, a suitable means for cooling the welding jaws and electrodes may be provided. Water or other suitable cooling fluid flows in passageway 146 within the welding cable to a flexible hose 148 or the like leading to a passage 150 in one of the welding jaws, then through another flexible hose 151 to the other welding jaw, through a passage 152 in said jaw and then to an outlet or return line 154. In this way the welding jaws and electrodes carried thereby do not become overheated during continuous operation.

The operation of the device illustrated in Figures 1–4 inclusive, of the drawings is believed to be fully described above but will be briefly summarized. The operator places the welding jaws about the work to be welded, closes the push button switch in the handle of the welding gun to cause the solenoid air valve to allow air under pressure to enter chamber 76 and force diaphragm 84 and piston 94 downwardly against the force of coil spring 92. Downward movement of the piston builds up hydraulic pressure in chamber 47 between the rear ends of the welding jaws, securely clamping the electrodes carried by the forward ends of the jaws against the work to be welded. After the electrodes are securely clamped against the work the welding current is applied and the weld completed. The mating surfaces of the brackets and spherical portions of the welding jaws tightly contact each other due to the pressure applied to the jaws at the time the welding current is first applied, thus reducing arcing between these parts to a minimum. After the weld is completed the jaws still are in pressure engagement with the work for a short period after the welding current is cut off, thus insuring a strong weld.

During intervals when the pressure at the welding electrodes is released, the welding jaws may be moved through a wide range of welding positions without moving the supporting brackets and heavy welding cable, the curved or spherical mating surfaces on the brackets and welding jaws permitting this movement. The electrodes carried by the forward ends of the welding jaws are movable, without moving the supporting brackets and cables, to any position on the curved surface of the sector of a sphere, the vertex of which is the central portion of the pivotal connection between the welding jaws and supporting brackets and the angle between the sides of the sector in any plane through the axis of the same being about 90°. This will vary slightly due to the particular shapes and sizes of the supporting brackets and welding jaws. Upon clamping the electrodes on the work in any position on the surface of the spherical sector, the welding operation may be performed as described above.

Figure 5:
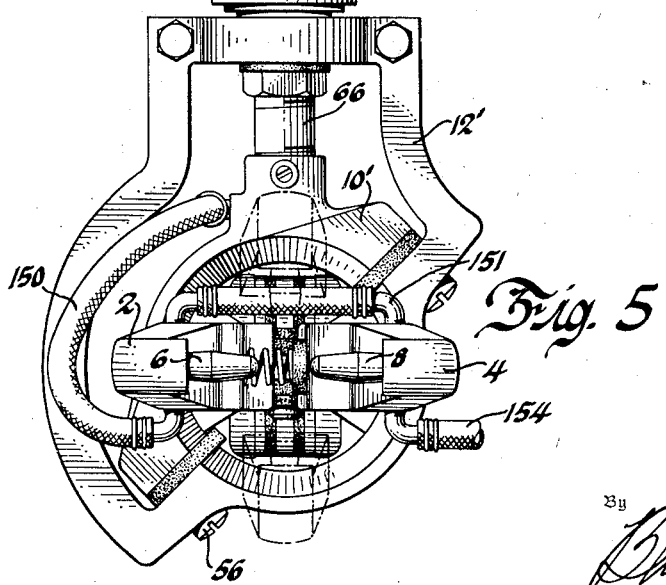
Figure 5 is an end view of a modified form of the welding jaws and support therefor.

In Figure 5 of the drawings is shown a welding gun generally similar to that of Figures 1 to 4, inclusive, except that the supporting brackets 10' and 12' are arranged at a different angle than are brackets 10 and 12 of Figures 1 to 4 inclusive. The form of device illustrated in Figure 5 may be of particular advantage in welding parts arranged in a vertical plane.

In Figures 6 and 7 of the drawings is illustrated a modified construction in accordance with the invention that has a wider range of electrode welding positions than the form shown in Figures 1 to 5 inclusive. In the device of Figures 6 and 7, also, a different form of actuating means for moving the welding jaws and electrodes is utilized, although, it will be understood, this form of actuating means may be used in place of that shown in Figures 1 to 5 inclusive of the drawings.

In Figures 6 and 7, 160 is a bracket or yoke of suitable current conducting material connected at end 161 to a conducting portion of the cable leading to one side of the secondary of a welding transformer and at the other end by means of a clamp type bearing 162 to a current carrying member 164 having an annular or ring portion 165. Another bracket or yoke 166 is connected at 167 to a conductor portion 168 of the welding cable leading to the other side of the secondary of the welding transformer and has one end connected by means of a clamp type bearing 169 to a current carrying element 170 having an annular or ring portion 171.

Member 160 is secured to member 166 by cap screws 172, members 160 and 166 being electrically insulated from each other by insulators 174 and 176. Ring portions 165 and 171 are secured to each other by a series of screws 178, there being provided a suitable electrical insulator 180 of annular shape between the ring portions and suitable sleeves 182 of insulating material around the threaded ends of the screws 178. An annular electrical insulator 184 is secured to the ring portion 165 by screws 186, the heads of the latter being countersunk in the insulation. A substantially similar electrical insulator 188 of annular shape is secured to ring portion 171 by means of screws 190, the heads of which are countersunk in the insulator.

Insulators 180, 184 and 188 project inwardly toward the center of ring portions 165 and 171, the projecting portions being adapted to fit in grooves or cut away portions 192, 194 and 196 formed in floating shoe members 198 and 199, the shoes being arcuate shaped and free to rotate within the ring portions 165 and 171 and being guided during rotation by the mating projecting portions of the insulators and the cut away portions of the floating shoes. Floating shoe 198 has an arcuate insulator 200 secured thereto by one or more screws 202, the heads of which are countersunk in the insulator, while floating shoe 199 has a similar insulator 204 secured thereto by one or more screws 206, the heads of which are countersunk in the insulator. Arcuate insulator 200 insulates floating shoe 198 from ring portion 165, while insulator 204 insulates floating shoe 199 from ring portion 171. In this way shoe 198 in any position of rotation within ring portion 165 is always electrically connected to one side only of the line from the welding transformer, while shoe 199 is always electrically connected to the opposite side only of the line.

A pin 208 secured at one end to floating shoe 198 has its free end within an arcuate slot or groove 210 formed in the curved surface 212 of a welding jaw 214. A similar pin 216 is secured at one end to the floating shoe 199 and has its free end within an arcuate slot or groove 218 formed in the curved surface 220 of a welding jaw 222. At a point approximately midway between the ends of the welding jaw 214 are a plurality of arcuate grooves 224 in opposite sides of the welding jaw, while in a corresponding part of welding jaw 222 are a plurality of similar grooves 226. Insulator elements 228 and 230 having projecting portions 232 and 234, respectively, of circular shape are resiliently secured in the arcuate grooves, said arcuate grooves acting as raceways for the projecting portions during pivotal movement of the welding jaws. A bolt 236 and coil springs 238 and 240 resiliently secure the projecting portions of the insulators in said arcuate grooves. The springs tend to force insulators 228 and 230 toward each other and when the welding electrodes are in released or open position the central portions of the welding jaws are forced away from the floating shoes. This allows free movement of the welding jaws. A similar arrangement of springs and insulators may be used in the construction of Figures 1 to 5 inclusive in place of that shown, if desired.

Welding jaw 214 has an electrode 242 at the forward end thereof, while welding jaw 222 has an opposed electrode 244 at its forward end. At the rear end of welding jaw 214 is a handle 246 carrying a switch 248 and electrically insulated from the handle by means of an insulator 250 of washer shape and an insulator 252 having a concave surface 254. The convex end 256 of a plunger 258 having a piston 260 at its opposite end engages the concave surface in pressure transmitting relation. Piston 260 is carried within a cylinder 262 removably secured to the rear end of welding jaw 222. Hydraulic pressure in cylinder 262 is adapted to force piston 260 toward the other welding jaw and thus force the electrodes into pressure engagement with the work 263 to be welded. A hydraulic fluid conducting member 264 is provided for the entry of hydraulic fluid into the cylinder. The device for building up hydraulic pressure in the cylinder is preferably that described in connection with the form of the invention illustrated in Figure 1.

It will be understood, also, that the means for moving the welding jaws illustrated in Figures 6 and 7 including the cylinder, piston and associated parts may be used in the form of welder illustrated on Figures 1 to 5 inclusive, if desired, in place of the form of jaw actuating means disclosed in Figures 1 to 5 inclusive. Similarly, the form of jaw actuating means of Figures 1 to 5 inclusive may be used in the form of the apparatus disclosed in Figures 6 and 7 in place of the means shown in these last mentioned figures if so desired. A coil spring 266 acting against insulator 267 biases the electrodes toward open position at all times, the insulator preventing flow of current at this point.

A means for conducting cooling fluid to the welding electrodes may be provided. This comprises a flexible conduit 268 leading to one welding jaw, a flexible conduit 270 leading from the first welding jaw to the second and a return or discharge conduit 272.

The operation of the device illustrated in Figures 6 and 7 is generally similar to that of the welder illustrated in Figures 1 to 5 inclusive. After the electrodes are placed around the work to be welded, the operator closes switch 248 in the handle of the gun which completes an electric circuit to a solenoid actuated air valve as illustrated in Figure 1 causing the air and hydraulic pressure means to actuate the piston 260 to clamp the electrodes against the work and thereafter the welding current is supplied to the electrodes.

During intervals when the electrodes are not in pressure engagement with the work, the floating shoes within the ring portions of the supports permit the welding jaws and electrodes to be free for rotation within the ring portions, while the pin and slot connection between the jaws and floating shoes enables the jaws and electrodes to have a wide range of movement in the plane of the pins and slots. In this way a wide range of welding positions may be reached without having to move the heavy welding cable and associated parts.

With the rings, floating shoes and insulators arranged as shown, each electrode is always connected to the same side of the secondary of the welding transformer and insulated from the other side in such a way that the welding operation may be performed in any position to which the electrodes may be moved.

Loosening of the bolts of the clamp bearings 162 and 169 enables members 164 and 170, carrying ring portions 165 and 171, respectively to be moved to various positions within the bearings as may be desired. The bolts then may be tightened to secure the parts in the adjusted position. The clamp type bearings may be used, also, in the form illustrated in Figures 1 to 5 inclusive if desired to change the welding positions of the electrodes.

It will be noticed that in each of the modifications illustrated in the drawings that the contacting portions of the welding jaws and support are in fixed pressure relation when the welding electrodes contact the work. This is important as any lack of pressure at the contacting surfaces of the jaws and support, or any relative movement between the two, during periods when the welding current is on will cause an electrical loss in the form of heat.

In each of the forms of the invention illustrated the contacting surfaces of the welding jaws and support are forced into pressure relation in a novel and efficient manner. When the opposed electrodes are being moved toward each other and toward the work the welding jaws act as levers of the first class with their fulcrums within the support as is apparent. When and after the electrodes contact the work, the work becomes a fulcrum for each of the jaws so that the jaws now act as levers of the second class and the desired pressure between the contacting surfaces of the welding jaws and support is obtained.

Various changes and modifications of the embodiments of my invention disclosed will be apparent to those skilled in the art without departing from the principles of my invention and I do not intend to limit the patent granted thereon except as necessitated by the prior art.

I claim:

1. In electric welding apparatus, a support, electrode carrying jaws mounted in said support for movement in more than one plane, and means for moving the electrodes into pressure engagement with the work to be welded, said support and electrode carrying jaws being formed of current conducting material and said means causing said support and jaws to be in current conducting relation when the electrodes are clamped on the work.

2. In welding apparatus as in claim 1, in which a current conducting cable is connected to the support whereby the electrodes may be moved to welding positions without moving said cable.

3. In electric welding apparatus, a support, welding jaws pivotally mounted in the support and movable in more than one plane, electrodes carried by said jaws and means for moving the welding jaws to bring the electrodes into engagement with the work to be welded in any of the planes of movement of the welding jaws, said support and welding jaws being formed of current conducting material and carrying current to the welding electrodes during a welding operation.

4. In electric welding apparatus, a support, welding jaws mounted in the support for movement in more than one plane, electrodes carried by said jaws, and means for moving the electrodes into engagement with the work to be welded in any of the planes of movement of the welding jaws, comprising hydraulic pressure actuated means carried by the welding jaws and means for building up hydraulic pressure to move said hydraulic pressure actuated means, said support and welding jaws being formed of current conducting material and carrying electric current to the electrodes during a welding operation.

5. In electric welding apparatus, a support, welding jaws pivotally mounted in the support and movable in more than one plane, opposed electrodes carried by said jaws and means for moving the welding jaws to bring the opposed electrodes into engagement with the work, said support forming a portion of the electrical circuit to the welding jaws and being formed of portions electrically insulated from each other, each of said portions being connected electrically with only one of the welding jaws in any position of jaw movement.

6. Welding apparatus as in claim 5, in which a current conducting cable is connected to the support whereby the welding jaws are movable in the support to a wide range of positions without having to move the support and welding cable.

7. In electric welding apparatus, a current conducting welding jaw support having a plurality of curved bearing surfaces in the shape of a portion of a sphere electrically insulated from each other, a plurality of current conducting welding jaws pivotally mounted in said support, each having a mating curved portion in the shape of a portion of a sphere contacting an adjacent curved bearing surface of the support whereby the welding jaws may be moved to a wide range of positions in more than one plane, said welding jaws being electrically insulated from each other when the jaws are in non-welding position, opposed electrodes carried by said welding jaws, a current conducting cable connected to said support so that opposite sides of the welding circuit are connected to the plurality of curved bearing surfaces that are insulated from each other and means for moving the welding jaws and electrodes carried thereby into welding position.

8. A welding apparatus as in claim 7, in which the last mentioned means comprises a flexible walled hydraulic chamber between the rear ends of the welding jaws, said flexible walls being non-conductors of electricity and insulating the rear ends of the welding jaws from each other.

9. In electric welding apparatus, a support formed of current conducting material having adjacent annular portions secured to each other in electrically insulated relation, a source of welding current connected to opposite sides of said annular portions, curved floating shoes of current conducting material within said annular portions and adapted to be movable therein when the device is in non-welding position, opposed welding jaws of current conducting material pivotally mounted within said floating shoes and electrically insulated from each other when the apparatus is in non-welding position, one of said jaws being in current conducting relation with one only of said annular portions and the other of said jaws being in current conducting relation with only the other of said annular portions in any position of said jaws, opposed electrodes carried by said opposed jaws and means for moving the welding electrodes into pressure relation with the work to be welded.

10. In electric welding apparatus, a support, opposed welding jaws pivotally mounted therein intermediate their ends, opposed electrodes carried by said opposed welding jaws adjacent the forward end of each of said welding jaws, means for moving the welding jaws comprising a flexible-walled hydraulic chamber mounted between the welding jaws at a point at the rear of said pivotal mounting and means for building up hydraulic pressure in said chamber, said flexible walls being non-conductors of electricity and insulating the rear ends of the welding jaws from each other.

11. In electric welding apparatus, opposed jaw members having arcuate shaped grooves intermediate the ends of said opposed jaw members, opposed welding electrodes carried by said opposed jaw members, insulating means having circular shaped projecting portions and means for securing said insulating means to said opposed jaw members with said arcuate shaped grooves forming a raceway for said projecting portions during relative movement between the opposed jaw members.

12. In electric welding apparatus, a support of current conducting material, opposed jaws of current conducting material mounted therein and adapted to be in current conducting pressure relation with the support during a welding operation, opposed welding electrodes carried by said opposed welding jaws, and means for moving the welding jaws into welding position; said jaws being mounted to act as levers of the first class with their fulcrums within the support while the welding electrodes are being moved toward the work and to act as levers of the second class with the work as their fulcrums when the electrodes engage the work to thereby force contacting surfaces of the support and welding jaws into fixed pressure engagement with one another.

13. A welding apparatus as in claim 3, in which a current conducting cable is connected to the support whereby the electrodes may be moved to welding positions without moving said cable.

14. In a welder, a pair of arms; electrodes located on the arms; a pair of welding current conductors for pivotally connecting the arms; and means for pressing the arms against the conductors and the electrodes against the work.

15. In a welder, a pair of electrodes; a pair of arms, each arm supporting an electrode; a pair of conductors for the welding current; and a fluid-pressure means operable to press each arm against a conductor, upon engagement of work by the electrodes.

16. In a welder, a pair of welding current conducting arms; an electrode supported in electrical conducting relation on each arm for engaging the work; a pair of welding current conductors, the conductors having rigid current conducting portions for pivotally supporting each arm about an axis and positively resistant to movement of the arms transverse the axis; and means for pivotally moving the arms to engage the work, said means operating to press each arm, when the electrodes have engaged the work, against a conductor supporting portion and the work.

17. In a welder, a pair of welding current conducting arms; an electrode supported in electrical conducting relation on each arm for engaging the work; a pair of welding current conductors, each conductor providing a fulcrum for an arm; and means for pivotally moving the arms on the fulcrums to cause electrode engagement of the work, each arm being thereafter adapted, in response to said means, to fulcrum on the work and to bear against the conductors.

18. In electric welding apparatus, a support formed of current conducting material having adjacent annular portions secured to each other in electrically insulated relation, a source of welding current connected to said annular portions, a pair of pivoted welding jaws of current conducting material, a pair of welding electrodes carried thereby, means formed of current conducting material for supporting the pivoted welding jaws for free movement within said annular portions when the device is in non-welding position and adapted to be in fixed current conducting relation with the welding jaws and annular portions during the welding operation, and means for moving the welding jaws about their pivot to bring the welding electrodes into pressure engagement with work to be welded and to press the supporting means for the pivoted arms against said annular portions into fixed current conducting relation therewith.

19. In electric welding apparatus, a pair of welding current conducting arms, an electrode supported in electrical conducting relation on each of said arms for engaging work to be welded, a pair of welding current conductors having means for supporting the arms for movement in a plurality of planes, and means for pressing the electrodes against the work and the arms against the conductors in any of said plurality of planes.

MARCUS R. HARRIS.